Figure 1:
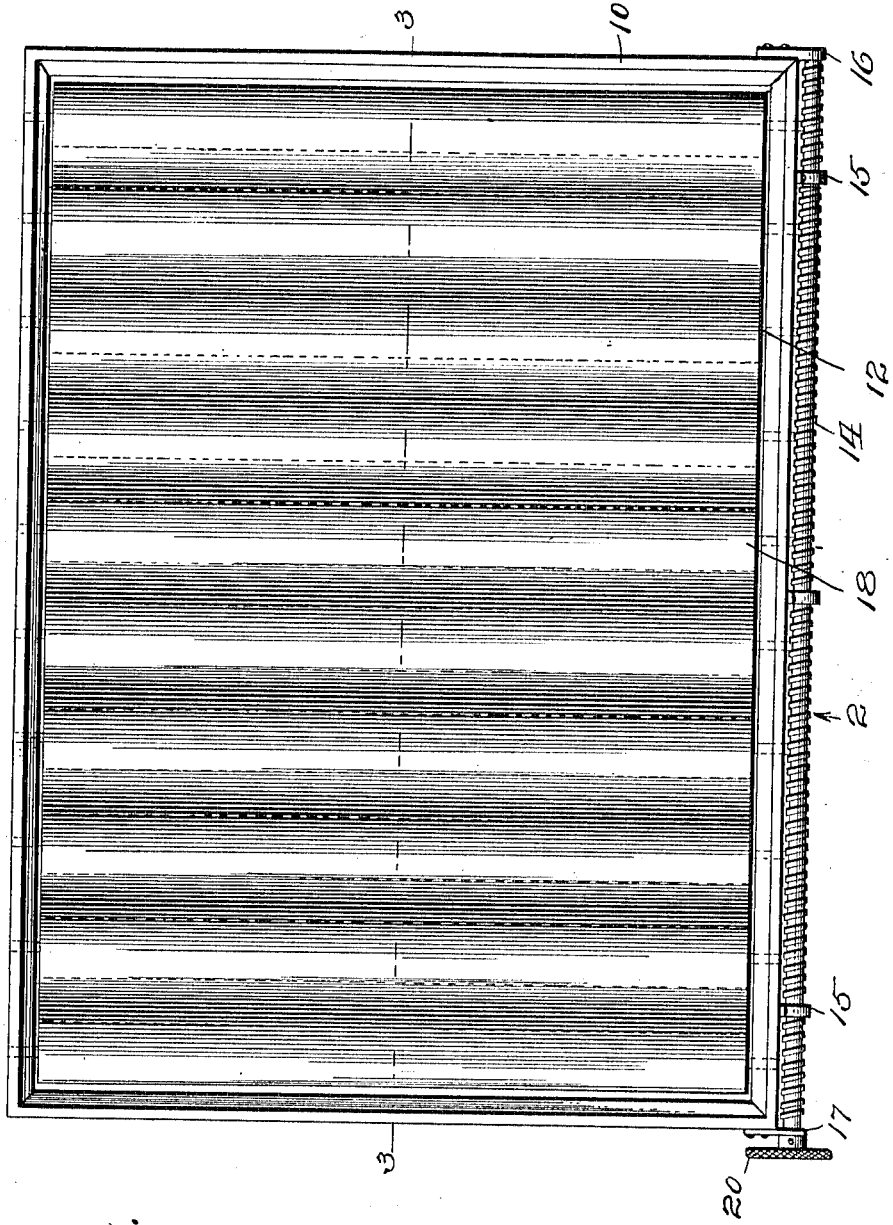

J. L. SHUTE.
EGG SUPPORTING SURFACE FOR INCUBATORS.
APPLICATION FILED OCT. 17, 1912.

1,080,489.

Patented Dec. 2, 1913.
2 SHEETS—SHEET 1.

Witnesses
G. M. Fowler Jr.
J. D. Morrill

Inventor
James L. Shute,
By Mason Fenwick Lawrence,
Attorneys

J. L. SHUTE.
EGG SUPPORTING SURFACE FOR INCUBATORS.
APPLICATION FILED OCT. 17, 1912.
1,080,489.
Patented Dec. 2, 1913.
2 SHEETS—SHEET 2.
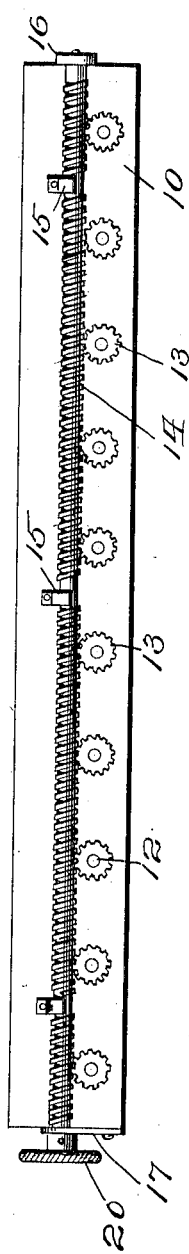
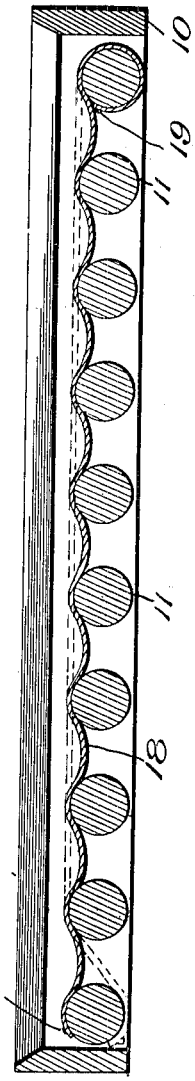
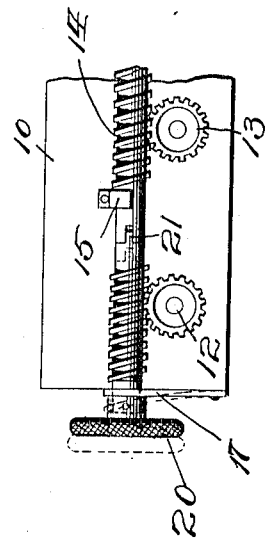
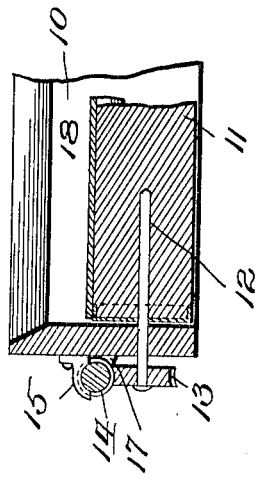
Inventor
James L. Shute.
By Mason Fenwick & Lawrence
Attorneys
Witnesses

UNITED STATES PATENT OFFICE.

JAMES LOVELL SHUTE, OF SEATTLE, WASHINGTON.

EGG-SUPPORTING SURFACE FOR INCUBATORS.

1,080,489.  Specification of Letters Patent.  Patented Dec. 2, 1913.

Application filed October 17, 1912. Serial No. 726,323.

*To all whom it may concern:*

Be it known that I, JAMES L. SHUTE, a citizen of the United States, residing at Seattle, in the county of King and State of Washington, have invented certain new and useful Improvements in Egg-Supporting Surfaces for Incubators; and I do hereby declare the following to be a full, clear, and exact description of the invention, such as will enable others skilled in the art to which it appertains to make and use the same.

This invention relates to incubators, and has for an object to provide an egg supporting surface having improved features for turning the eggs and providing a hatching surface.

A further object of the invention is to provide in an egg supporting surface a plurality of spaced rollers covered by a fabric proportioned to permit slack between each two rollers and with means for rotating all of said rollers simultaneously to move the fabric in turning the eggs.

A further object of the invention is to provide in an egg supporting surface a plurality of rollers with a fabric cover providing slack between each two of said rollers, and with means for stretching the cloth taut upon the said rollers to provide a hatching surface.

With these and other objects in view the invention comprises certain novel constructions, combinations and arrangements of parts as will be hereinafter more fully described and claimed.

In the drawings: Figure 1 is a top plan view of the egg supporting surface disassociated from the remaining incubator structure. Fig. 2 is a view in side elevation of the egg supporting framework showing the pinions connected with the rollers and the worm for operating the pinions. Fig. 3 is a transverse sectional view through the egg supporting surface as indicated by line 3—3 of Fig. 1. Fig. 4 is a fragmentary sectional view of one end of one of the rollers showing the trunnion and operating means. Fig. 5 is a detail view of a modification of the operating worm.

Like characters of reference designate corresponding parts throughout the several views.

The improved egg supporting surface which forms the subject matter of this application comprises a frame 10 which may form a part of the incubator housing and has journaled thereon a plurality of rollers 11, such journaling being accomplished in any usual and ordinary manner as providing the rollers with trunnions 12 which extend through the framework 10 and serve to permit the rollers to move rotatably upon their said trunnions.

At one side the trunnions extend beyond the lines of the frame 10 and are each provided with a pinion 13, such pinions being located in alinement and engaged by a worm 14. The worm 14 is journaled along the side of the frame 10 and may be either within or without the incubator as circumstances may make desirable. The journaling of the worm 14 is accomplished in any approved manner as by the employment of keepers 15 which hold the worm down upon the pinions and by the end bearings 16 and 17 which serve to hold said worm against longitudinal movement.

The several rollers 11 within the frame 10 are preferably spaced to support the eggs between such rollers and over the top of such rollers a fabric 18 is employed secured to the end rollers as indicated at 19 and of sufficient length to permit a slack or scallop shape between each two rollers such slack accommodating and supporting the eggs resting thereon.

It will be apparent that when the worm 14 is rotated by means of the knurled head 20 all of the rollers will be simultaneously rotated and the fabric 18 will be moved longitudinally of the frame 10 but will retain the initial slackness so that the eggs will be rolled in conformity with the movement of the fabric but will still remain in the slack between the same two rollers.

At the expiration of the incubating period and at the hatching time it is desirable to provide a substantially plane surface for the chicks. To accomplish this the worm is rotated so that the fabric 18 is wholly unwound from one of the said rollers and winding begun in the opposite direction, as indicated in dotted lines at Fig. 3 whereby the fabric will be stretched taut to produce such plane surface. As the winding of the roll in the opposite direction as indicated in dotted lines will produce a furrow along one side it is desirable to arrange the worm so that all the rollers may remain stationary excepting one which is to be rotated to tighten the fabric. For this purpose the bearing 17 is made movable, as for instance resilient as shown at Fig. 5, and the worm shaft provided with a clutch, as indicated at 21 in said figure, whereby the section of the shaft may be disconnected so that the said roller may be rotated independently of and while the remaining rollers stand stationary, held by the stationary portion of the worm. By the use of this modification the roller next the knurled head 20 may be rotated independently of the others to tighten the fabric without producing the furrow as indicated in dotted lines at Fig. 3.

I claim:

1. In an egg supporting device, a plurality of rollers, a flexible sheet covering the rollers and secured to certain of the latter, a pinion connected with each roller, means engaging the pinions and comprising a plurality of independent sections one of which is arranged to be operated separately, and means for operating the sections simultaneously.

2. In an egg supporting device, a plurality of rollers, a flexible sheet covering the rollers and secured to certain of the latter, a pinion connected with each roller, means engaging the pinions and comprising a plurality of independent sections one of which is arranged to be operated separately, and means for operating the sections simultaneously, said means last mentioned comprising interlocking members and a device for holding the members engaged.

3. In an egg supporting surface, a plurality of rollers spaced to support eggs therebetween, trunnions for said rollers, pinions carried upon the trunnions, a worm engaging all of said pinions, and means to disconnect a portion of said worm to rotate a part of said rollers independently of the others.

In testimony whereof I affix my signature in presence of two witnesses.

JAMES LOVELL SHUTE.

Witnesses:
WILLIAM BORTHWICK,
H. D. BUTTERWORTH.

---

Copies of this patent may be obtained for five cents each, by addressing the "Commissioner of Patents, Washington, D. C."